Nov. 14, 1967  G. LE ROY MARQUART ET AL  3,352,166

VEHICLE PLANETARY TRANSMISSION WITH PTO

Filed March 9, 1966  2 Sheets-Sheet 2

INVENTORS
G. LeROY MARQUART
R. A. MICHAEL

3,352,166
VEHICLE PLANETARY TRANSMISSION WITH PTO

Gordon Le Roy Marquart, Jesup, and Richard Arlo Michael, Waterloo, Iowa, assignors to Deere & Company, Moline, Ill., a corporation of Delaware
Filed Mar. 9, 1966, Ser. No. 533,074
10 Claims. (Cl. 74—15.84)

ABSTRACT OF THE DISCLOSURE

A dual-ratio planetary auxiliary transmission usable in conjunction with and for doubling the number of speed ratios in a multi-speed speed-change transmission and incorporating a PTO capable of running at a constant speed regardless of the speed ratio of the auxiliary transmission.

---

This invention relates to a vehicle transmission and more particularly to a range transmission of the planetary type having special utility in agricultural and industrial tractors as an optional unit for modifying the basic ratios in the vehicle transmission and for providing a constantly-running PTO.

Most agricultural and industrial tractors have basic transmissions provided with a relatively large number of speed ratios, for example, six through ten speeds forward and two through four speeds in reverse, designed into the transmission to enable the vehicle to perform satisfactorily under normal operating conditions. It is known to adapt the vehicle to special circumstances by adding thereto an auxiliary dual-ratio or range transmission ahead of the main transmission, either as a high-low or as a forward-reverse unit for modifying the basic transmission ratios.

Among the problems encountered in the design and manufacture of such range transmissions is that of adapting a suitable unit to an acceptable vehicle configuration, for in most cases the vehicle is intended as a basic model to be normally furnished with the basic transmission, with the range transmission available as an option. Other problems involve cost, size etc. of the range transmission and retention of the constantly-running characteristics of the vehicle PTO; that is, the PTO must run at a selected speed regardless of transmission ratio or direction and must also be capable of running even though the main or propulsion clutch of the vehicle is disengaged.

It is therefore the principal object of the invention to provide an improved range transmission of the character described, significant in that it is of low-cost design, compact in size, retains desirable PTO characteristics, is adaptable to a basic vehicle configuration, and employs a compact planetary unit with relatively small clutch and brake means and dispenses with the need for complicated over-running clutches etc.

Briefly, these and other objects are achieved by embodying in the vehicle housing a planetary gear unit having an input sun gear, a coaxial output gear, a carrier having planetary gear means meshing with those gears, clutch and brake means selectively engageable and disengageable to provide direct and reduction drives, input (propulsion) and output shafts coaxially connected respectively to the input and output gears, hollow drive (power) and driven (PTO) shafts respectively sleeved over the input and output shafts, and annular means generally enclosing the planetary unit and clutch and brake means and connecting the drive and driven shafts for rotation in unison so that the PTO drive in effect bypasses the range transmission. Further features are that the range unit uses sun gears for both the input and output, employs radial portions of the planetary carrier as parts of the planetary clutch and brake means, journals the hollow drive and driven shafts in the housing while journaling the input and output shafts in the hollow shafts and the carrier on the hollow shafts.

The foregoing and other important objects and features will become apparent from the following description of one form of the invention as shown in the accompanying drawings.

Figure 1:
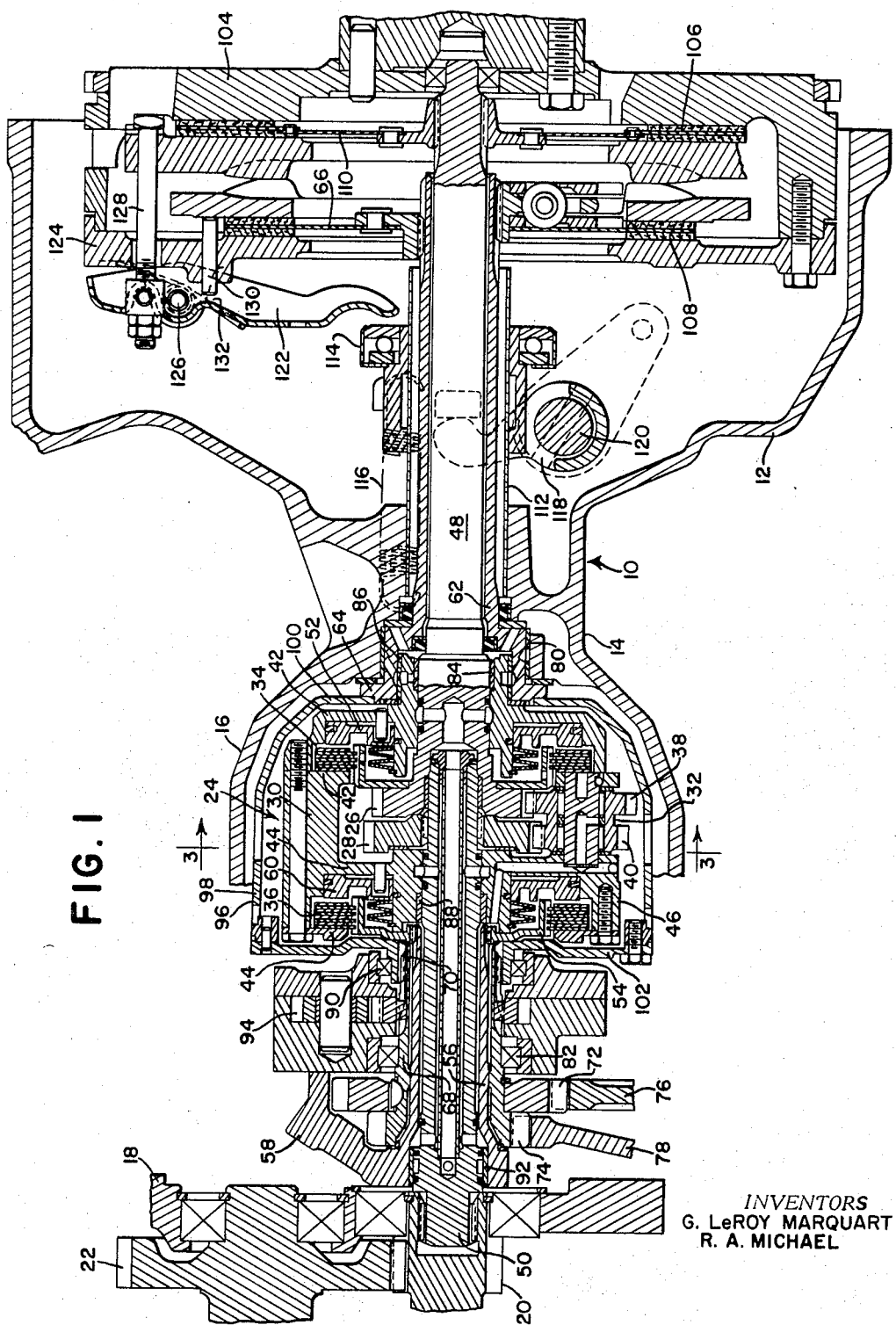
FIG. 1 is a longitudinal sectional view.
Figure 2:
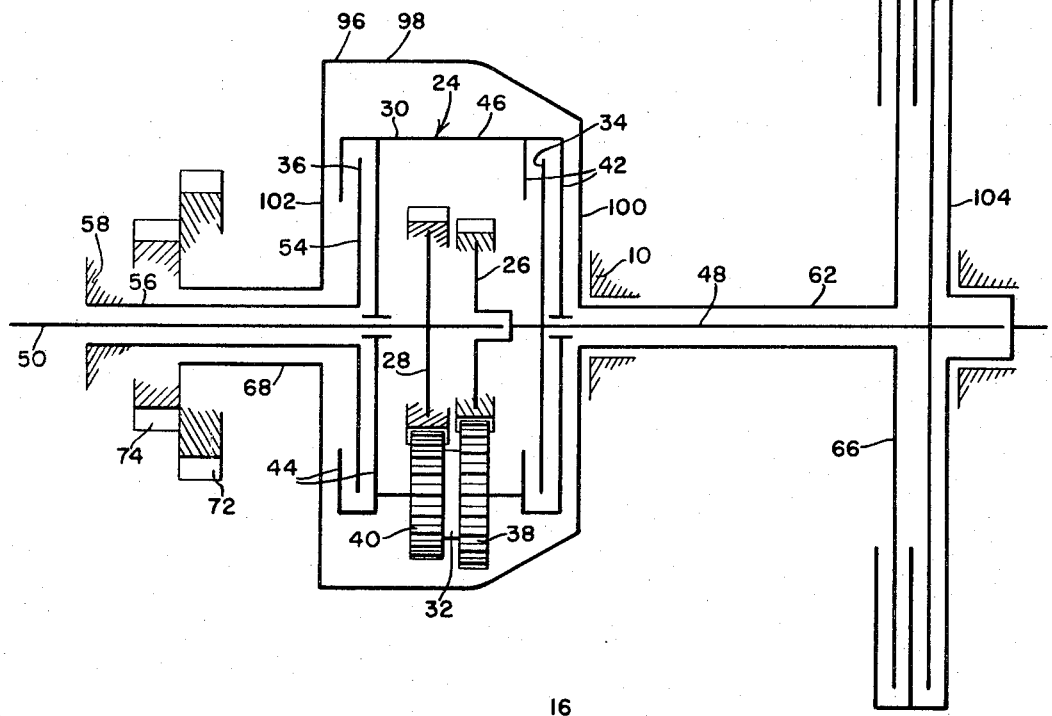
FIG. 2 is a schematic view on a reduced scale.
Figure 3:
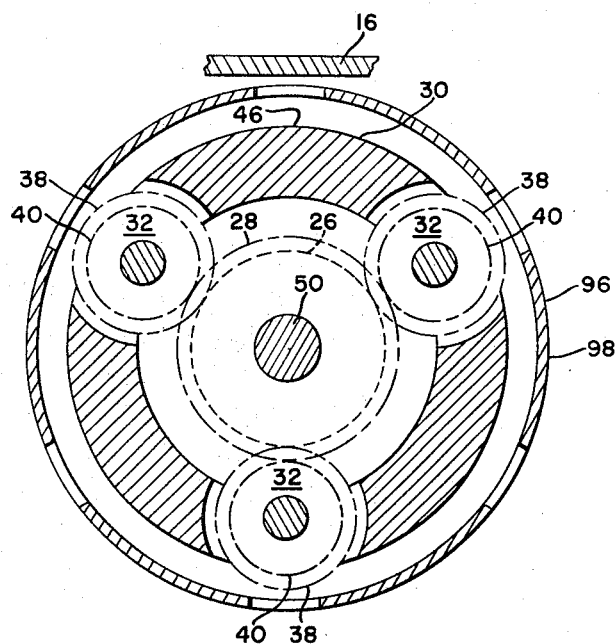
FIG. 3 is a section generally along the line 3—3 on FIG. 1.

The vehicle has a basic housing 10 including a relatively large bell-shaped forward portion 12, a materially reduced intermediate portion 14 and a rearward bell-shaped portion 16 that is considerably smaller than the portion 12. Rearwardly beyond the portion 12 is the main transmission case 18 of the vehicle, portions of the transmission being shown by way of meshing gears 20 and 22.

The housing portion 16 houses a planetary unit 24 comprising coaxial relatively rotatable input and output sun gears 26 and 28, a planetary carrier 30, a plurality of planetary clusters 32, a planetary clutch 34 and a planetary brake 36. Each planetary clutch is a spool having first and second conjointly rotatable planetary pinions 28 and 40 in constant mesh respectively with the sun gears 26 and 28.

The planetary carrier is of generally drum-like construction, having a pair of first and a pair of second (front and rear) radial wall portions 42 and 44 joined by an annular portion 46, and these portions are centrally apertured to accommodate coaxial input (propulsion) and output shafts 48 and 50. These shafts are coaxially affixed respectively to the sun gears 26 and 28 and extend in axially opposite directions (forwardly and rearwardly) from the planetary unit 24. The planetary clutch 34 is of the radial multi-plate type and cooperates with the front walls 42 of the carrier 24. This clutch is normally spring-disengaged and is applied hydraulically in any known manner, as by a piston 52. The planetary brake is also of the radial multi-plate type, spring-disengaged and hydraulically applied and cooperative between the carrier rear walls 44 and a hub 54 affixed to the forward end of a tubular housing portion 56 that extends forwardly from an integral rear housing portion 58 in surrounding relation to the output shaft 50. The brake piston is shown at 60.

The planetary range unit 24 provides direct drive to the output shaft 50 when only the planetary clutch 34 is engaged, since the input shaft and its sun gear are then locked up to the planetary carrier 30. Reduction drive to the output shaft 50 occurs when only the brake 36 is applied, since the carrier 30 is locked to the housing and the output sun gear 28 is driven from the input sun gear 26 through the planetary cluster 32. The output shaft 50 is coaxially splined to the input gear 20 of the main transmission, the basic ratios of which are obtained when the unit 24 is in direct drive and which ratios are of course modified when this unit is in reduction drive. The nature of the ratio modifications will naturally depend upon the ratio designed into the unit 24.

A hollow drive (power) shaft 62 is coaxially sleeved over the input shaft 48 and has its rear end terminating at 64 just ahead of the carrier 30 and its forward end splined to a clutch plate 66. A coaxial hollow driven (PTO) shaft 68 is sleeved over the output shaft 50 and has its forward end 70 closely adjacent the rear part of the carrier 30. The rear end of the shaft 68 has two gears 72 and 74 affixed thereto, and these are in constant mesh with two PTO gears 76 and 78 that may be connected in any suitable manner to the ultimate PTO shaft (not shown). The hollow shafts 62 and 68 are journaled in the housing by bearings 80 and 82. The shaft 48 has its front end piloted in the flywheel 10 and its rear end journaled by a bearing 84. The shaft 50 is supported at its front end in the sun gear 26 and at its rear end in the housing-journaled gear 20. The unit 24 is journaled by bearings 86, 88 and 90. An oil sleeve is provided at 92. The PTO shaft 68 may drive other means in addition to the PTO, as, for example, a hydraulic pump 94.

The two hollow shafts 62 and 68 are rigidly interconnected by hollow means 96 of drum-like construction that relatively closely surrounds the planetary unit 24. This means has an annular portion 98 and front and rear radial portions 100 and 102 that are suitably affixed respectively to the rear end 64 of the hollow front shaft 62 and to the front end 70 of the rear shaft 68, thus interconnecting these two shafts for rotation in unison in by-passing relation to the planetary unit 24.

The initial drive for the transmission and PTO may be an internal combustion engine, the flywheel 104 of which is contained within the forward housing portion 12. Within the flywheel are incorporated first and second or propulsion and PTO clutches 106 and 108, the latter including the clutch plate or disk 66 on the hollow PTO drive shaft 62 and the former including a clutch plate 110 splined to the forward end of the input or propulsion shaft 48. Both clutches 106 and 108 are normally spring-engaged to furnish constant power to the shafts 48 and 62. If the planetary clutch 34 and brake 36 are both disengaged, there will be no drive to the vehicle transmission, but the PTO shaft 68 and gears 72–76 and 74–78 will be driven nevertheless. The planetary clutch and brake may be selectively engaged and disengaged to drive the vehicle without affecting the normally engaged condition of either of the large clutches 106 and 108.

The sequential operation of the clutches 106 and 108 is such that the propulsion clutch 106 may be disengaged without disengaging the PTO clutch 108. Also, following disengagement of the propulsion clutch, further clutch control in the same direction will disengage the PTO clutch. For this purpose, a housing sleeve 112 carries a throwout bearing 114, normally biased to the rear by a spring 116 and movable forwardly by an arm or yoke 118 fixed to a transverse rockshaft 120. The rockshaft may be rocked in any appropriate manner, as by the conventional clutch pedal (not shown). The throwout bearing is engageable with a plurality of clutch fingers 122, each pivoted to the clutch backing plate 124 at 126 and engageable initially with a tension member 128 to disengage the propulsion clutch 106 and sequentially engageable with a compression member 130 (because of lost motion at 132) to disengage the PTO clutch 108. Thus, if the throwout bearing is moved forwardly only enough to disengage the propulsion clutch 106 by means of the finger 122 and tension member 128, the engaged status of the PTO clutch will not change. This allows the PTO to keep running. Maximum forward movement of the throwout bearing 114 disengages both clutches 106 and 108 in that order and stops both the vehicle and the PTO. So long as the PTO clutch is engaged, ratio changes in the planetary unit 24 by alternating engagement of the planetary clutch 34 and brake 36 have no effect on the PTO.

The design of the unit 24 is such that it lends itself very well to its accommodation in the relatively small portion 16 of the housing, enabling considerable size reduction in that part of the tractor that is conventionally just ahead of the operator's station. Moreover, the axial spacing between this unit and the large clutches 106 and 108 affords room in the upper part of the intervening housing portion 14 for housing other vehicle components, such as parts of the tractor steering mechanism (not shown).

Other features and advantages of the invention will be apparent to those skilled in the art, all without departing from the spirit and scope of the present invention.

What is claimed is:

1. A vehicle transmission, comprising: a housing, a planetary gear unit including an input sun gear, a coaxial relatively rotatable output gear, a carrier having planet gear means meshing with the sun and output gears, a clutch selectively engageable to lock up the unit for direct drive and a brake selectively engageable to lock the carrier to the housing for reduction drive; input and output shafts coaxial with and connected respectively to the input sun and output gears and extending in axially opposite directions from said unit; a hollow drive shaft coaxially loosely surrounding the input shaft; a hollow driven shaft coaxially loosely surrounding the output shaft; annular hollow means coaxially loosely surrounding the unit and coaxially interconnecting the drive and driven shafts; first means for driving the input shaft; and second means independent of the first means for driving the drive shaft at a selected speed irrespective of changes between direct and reduction drive in said unit.

2. The invention defined in claim 1, in which: the output gear is a sun gear and the planet gear means is a cluster comprising a pair of coaxially connected pinions meshing respectively with said sun gears.

3. The invention defined in claim 1, in which: the housing includes a portion affixed thereto and extending axially through the hollow driven shaft to provide a fixed part for said brake.

4. The invention defined in claim 1, in which: the first and second drive means respectively include first and second separate clutches additional to said unit clutch.

5. The invention defined in claim 4, including means for disengaging said drive means clutches sequentially so as to disengage the first clutch prior to disengaging the second clutch.

6. The invention defined in claim 1, in which: the carrier is of drum-like construction having first and second coaxially spaced apart radial portions respectively proximate to the input and output shafts and a substantially annular portion interconnecting said radial portions, the unit clutch includes said first portion and the unit brake includes said second portion.

7. The invention defined in claim 6, in which: the annular means interconnecting the drive and driven shafts is of drum-like construction larger than the carrier and includes first and second radial portions and an annular portion lying closely outside, respectively, of the corresponding carrier portions.

8. The invention defined in claim 1, in which: the drive and driven shafts are journaled on the housing, the input and output shafts are journaled respectively within said drive and driven shafts, and the carrier is journaled of said input and output shafts.

9. The invention defined in claim 1, in which: the first and second drive means respectively include first and second separate clutches additional to said unit clutch, and means is provided for engaging and disengaging said first drive means clutch while said second drive means clutch remains engaged.

10. The invention defined in claim 1, in which: the first and second drive means respectively include first and second coaxially closely spaced apart clutches coaxially connected respectively to the input and drive shafts in axially spaced relation to said unit, said clutches being relatively larger in diameter than said unit and its associated annular means, and said housing includes a relatively large portion encircling said clutches and a relatively smaller portion closely encircling said unit and annular means.

References Cited

UNITED STATES PATENTS

| 2,756,600 | 7/1956 | Kamlukin et al. | 74—15.84 |
| 2,975,656 | 3/1961 | Haverlender | 74—15.84 X |
| 3,080,764 | 3/1963 | Miller et al. | 74—15.84 |
| 3,094,013 | 6/1963 | Ferguson | 74—15.84 X |

FOREIGN PATENTS

| 774,271 | 5/1957 | Great Britain. |

DONLEY J. STOCKING, *Primary Examiner.*

L. H. GERIN, *Assistant Examiner.*